United States Patent [19]

Pilling

[11] Patent Number: 4,600,813
[45] Date of Patent: Jul. 15, 1986

[54] LINE CONCENTRATOR

[75] Inventor: Gerald A. Pilling, Ipswich, England

[73] Assignee: British Telecommunications, London, England

[21] Appl. No.: 524,774

[22] Filed: Aug. 19, 1983

[30] Foreign Application Priority Data

Aug. 24, 1982 [GB] United Kingdom ............... 8224232

[51] Int. Cl.⁴ .................... H04Q 1/22; H04Q 3/60
[52] U.S. Cl. .................... 179/18 FC; 179/175.2 C; 179/175.3 F
[58] Field of Search ...... 179/18 FC, 18 FG, 175.2 R, 179/175.2 C, 175.3 F; 370/56

[56] References Cited

U.S. PATENT DOCUMENTS

| | | | |
|---|---|---|---|
| 3,740,486 | 6/1973 | Freimanis | 179/18 FA |
| 3,903,374 | 9/1975 | Pommerening et al. | 179/18 GF |
| 4,110,566 | 8/1978 | Shanley | 179/18 GF |
| 4,150,258 | 4/1979 | Fujimoto et al. | 179/18 FC |
| 4,258,231 | 3/1981 | Lenz et al. | 179/18 FC |

FOREIGN PATENT DOCUMENTS 0075305  3/1983  European Pat. Off. ........ 179/18 FC

OTHER PUBLICATIONS

International Switching Symposium, Kyoto, Oct. 25th-29th, 1976, pp. 243-1-1-243-1-5; Tokyo, JP; Y. Suzuki et al: "A Line Concentrator Using Electronic Crosspoints", Pars. 3.3.3.5, FIGS. 3, 6, 7.

Patent Abstracts of Japan, vol. 2, No. 23, Feb. 15th, 1978, p. 11685E77 and JP-A-52 144 210 (Oki Denki Kogyo K.K.) 12-01-1977.

*Primary Examiner*—Thomas W. Brown
*Attorney, Agent, or Firm*—Nixon & Vanderhye

[57] ABSTRACT

A concentrator for telecommunication lines uses a crosspoint matrix (100) incorporating semiconductor switches. A number of subscriber lines (1–14) are inputs to the matrix, and a smaller number of trunk lines are outputs. A subscriber loop detector is connected as a further input line and is connected successively to the input lines to scan them for a signalling loop. The detector and input lines are connected over a column of the matrix corresponding to a usable output line, and this column is varied. When all trunk lines are in use scanning ceases.

14 Claims, 3 Drawing Figures

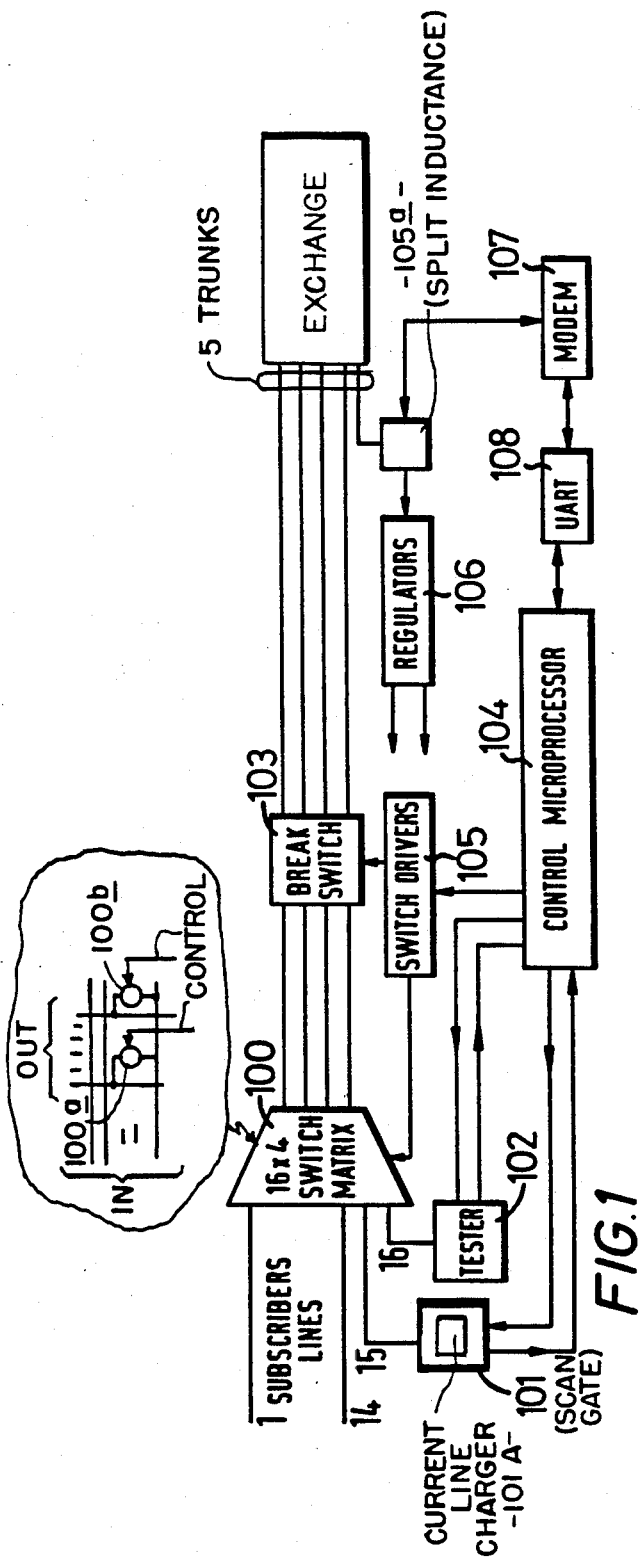
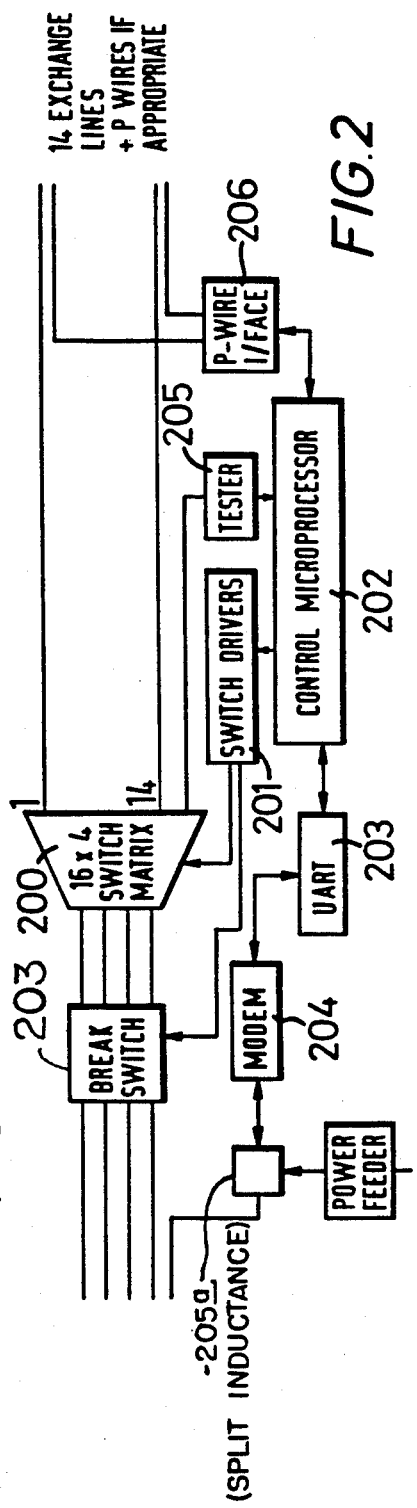

LINE CONCENTRATOR

DESCRIPTION

This invention relates to apparatus for concentrating a plurality of telecommunication lines.

It is a feature of many telephone systems that some lines, typically residential subscribers' lines, are used relatively infrequently. Rather than provide a dedicated line from each subscriber's terminal to the local exchange, some known systems employ line concentrators. These are devices which receive a number of input lines and have a fewer number of output lines. One example is a remote line concentrator situated in the vicinity of a number of subscribers and receiving the subscribers' lines as inputs. The smaller number of output lines from the concentrator comprise the lines to the local exchange usually referred to as trunk lines. It will however be appreciated that a concentrator need not be remote, at the subscribers' location, but may be employed anywhere in the telephone system.

Remote line concentrators must be controlled to efficiently allocate trunk lines to subscribers, and must detect when a subscriber is making a call, typically by detecting the signalling loop completed thereby; a trunk line is then connected to the subscriber, if one is available.

In known line concentrators switching is carried out by electromechanical means. Detection of a subscribers' signalling loop is achieved by a respective loop detector, exhibiting a high impedance shunt, connected to each subscriber's line. In alternative systems it has been proposed to incorporate a scanning arrangement on the trunk line side of the concentrator. In such an arrangement a line scanner is included on each trunk line, one line scanner being operational at any given time. The line scanner is connected via the trunk outlet to each of the subscribers' lines in turn and, upon detection of a subscriber's loop, transmits an appropriate signal to a controller to enable the subscribers' line to be connected to a free trunk line. When the trunk line to which the operating scanner is connected is required for connection to a subscriber's line then the scanning function is transferred to a line scanner on one of the other trunk lines. Since the line scanners each shunt a trunk line used for speech transmission, the scanners are required to have a high impedance, and their appearance to the line when not in use during speech transmission must be carefully considered. A further disadvantage of this system is the relatively high cost of providing one scanner for each trunk line. The alternative arrangement using a single scanner on one trunk line and using that trunk for speech transmission only when the others are all used, is possible, but it results in unequal usage of the available trunk lines and may mask a fault condition in the trunk line used for scanning. Calls will also be delayed until the scanning trunk becomes free again.

U.S. Pat. No. 4,110,566 describes a switching network comprising semiconductor crosspoints. The input lines to the network are connected to the network via interface port circuits. The switching network is an unbalanced low voltage network and the interface circuits are required to interface to the two-wire input lines and to provide a sink for dc bias currents. These interface port circuits also function to detect whether an input line requires connection, and since one is provided for each line, this adds considerably to the cost of the network.

In an article by Y. Suzuki in International Switching Symposium of Oct. 25-29, 1976, Kyoto, Tokyo, there is described a line concentrator with electronic cross points. In this system a line scanner is included which is operable to detect the condition of subscriber's lines. However, the line scanner is connected as a special column of the network and is dedicated to the scanning function. Thus an additional column is necessary over and above the columns required for the output lines, and as a result the number of cross points required is significantly increased.

The present invention seeks to provide apparatus for concentrating a plurality of telecommunications lines which exploits semiconductor switching technology and also alleviates some of the aforementioned disadvantages of known devices.

The present invention provides a line concentrator for concentrating a plurality of telecommunication lines. Subscribers' lines are received as inputs to the concentrator and a fewer number of trunks provide outputs from the concentrator. The concentrator uses a semiconductor switching matrix with a plurality of crosspoints for selectively connecting respective input lines to respective output lines and also includes a processor for controlling the switches which make or break the crosspoints. A line condition detector is connected as a further input line to the switch matrix and is connected by the switches to successive other input lines via a selectably variable pair of the crosspoints, each pair of crosspoints being associated with a usable output line. In this matter, the line condition detector scans the available input lines to determine whether any one of them requires connections to an output line.

The apparatus may be located in a telecommunications systems remotely from an exchange and at a subscriber's distribution point, said input lines being subscriber's lines and said output lines being trunk lines.

The present invention also provides a telecommunications network including remote apparatus as aforesaid together with deconcentrating apparatus at the exchange end of said trunk lines, receiving said trunk lines as inputs and having a greater number of output lines corresponding to said subscribers' lines, said deconcentrating apparatus including a semiconductor switching matrix controlled to restore the signals transmitted on a trunk line to the appropriate output subscriber's line before transmission to the exchange.

Embodiments of the invention will now be described, by way of example only, with reference to the accompanying drawings.

In the drawings:

FIG. 1 is a block schematic diagram of a remote line concentrator.

FIG. 2 is a block schematic diagram of a deconcentrator at an exchange; and

Figure 3:
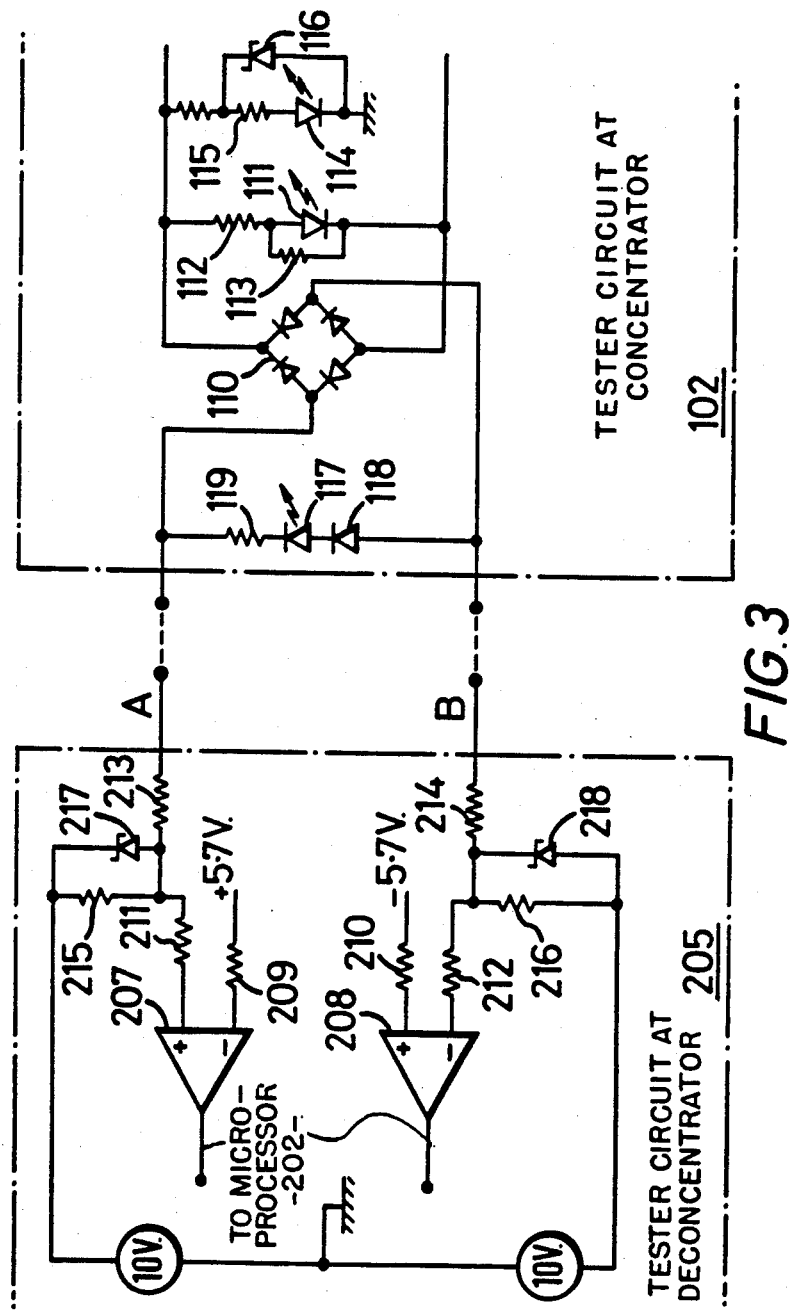
FIG. 3 is a circuit diagram of testing circuitry employed in part in the concentrator and in part in the deconcentrator.

Referring to FIG. 1, a remote line concentrator suitable for installation at a subscribers' distribution point has inputs from 14 subscribers' lines, numbered 1 to 14 in the figure, and outputs on 5 trunk lines to an exchange. The concentrator includes a 16×4 switching matrix 100 receiving as inputs the 14 subscribers' lines, a line 15 to a scan gate 101 (also herein referenced as a line condition detector), and a line 16 to a test unit 102.

Four of the available trunk lines are connected via respective break switches 103 to the outputs of the switching matrix. The fifth trunk line functions as a data link and power feed line, as will be described. The control logic is based on CMOS technology and includes a CMOS 8035 microprocessor 104. The microprocessor 104 controls, and receives signals from, both the scan gate 101 and the test unit 102 and in addition, transmits to, and receives signals from, a switch drive unit 105 containing the operating circuit for both the switching matrix 100 and the break switches 103.

The data link from the exchange comprises a half duplex line adapted to operate at a data rate of 300 baud. The data link is terminated by a split inductor 105A to allow the data link to provide the necessary DC power supply via a regulator 106, and a balun transformer to provide the data link to the microprocessor via a Modem 107 and a UART 108. A simple signalling system may be used in the system in which data messages sent along the data link require positive acknowledgements from the receiving end if the message is to be treated as having been successfully transmitted. A single parity bit may be included to provide some error protection. The exchange is designated the master and is able to compel operation of the microprocessor.

The switching matrix 100 comprises four two-wire 4×4 cross-point matrixes interconnected to produce the 16×4 matrix. The cross-points are semiconductor thyristor switches capable of withstanding ringing current superimposed on the battery voltage. The basic 4×4 semi-conductor matrixes are known and are commercially available. As depicted in the cut-away section with an arrow pointing to matrix 100, each two-wire input and each two-wire output line is depicted by a single line for simplicity. The intersections or "cross-points" are each capable of being electrically connected via controllable electrical switches 100a, 100b, etc. as will be well understood by those in the art.

The scanning of the subscribers' lines to detect subscribers' loops is accomplished using a single scanner. This scanner comprises the controlled scan gate 101 connected to line 15 of the switching matrix. The scanner thus acts as an additional subscriber's line and can be connected to any one of the subscribers' lines 1–14 by operating two of the cross-points so that both the scan line 15 and a particular subscriber's line are connected via the same switch matrix column. To reduce the possibility of cross-talk the scanner remains on one trunk line while interrogating the subscribers' lines. However, the exchange selects the next trunk line to be connected on a pseudo-random basis so that the switch matrix column being used for scanning is equally likely to be chosen as the next trunk outlet for subscribers' use. When this happens one of the other switch matrix columns is selected to become the one used for scanning by the control microprocessor 104, unless all trunk lines are being used, in which case scanning cases. When a subscriber's line is connected to a trunk line, the scanning algorithm is updated to control the scan gate and ensure that the connected subscriber's line is not scanned. When that subscriber clears his line, this is detected at the exchange and a signal is sent to the control microprocessor 104 to include that subscriber's line among the scanned lines.

A subscriber's loop is detected by the low voltage condition which occurs on the subscriber's line upon seizure. A simple voltage comparator is used to detect this voltage as is well known in the art. To prevent a leaky subscriber's line, for example, one with a 50 kΩ connection to ground, from wrongly appearing as a completed subscriber's loop, the line is charged before the voltage is registered. To reduce cross-talk the charge is applied to the line by a 10 ms ramp voltage, derived from a constant current line charging circuit 101A in conjunction with a capacitor.

The break switches 103 are conventional electromechanical switches and are operated by the drive unit 105 in synchronism with the thyristor switches in the switching matrix 100. Thus when a subscriber's line is connected to a trunk line in the switching matrix 100 the break switch on that trunk line is also made. Similarly, when a subscriber's line is removed from a trunk line, the corresponding break switch of the trunk line is released to isolate the trunk line from the switching matrix. The break switches 103 are necessary only with particular kinds of switching matrices. When thyristors are used, as in the present embodiment, the switches cannot be turned off while a d.c. current flows. Although, when a subscriber puts down his handset current should cease, if a fault condition occurs causing a leakage current then current may continue. The break switches 103 ensure that a proper open circuit results when a subscriber is disconnected.

Referring now to FIG. 2, a line deconcentrator is constructed analogously to the line concentrator of FIG. 1. The deconcentrator is located at the exchange ends of the trunk lines and comprises a 4×16 switching matrix 200 having four trunk line outputs and 14 line circuit outputs. A switch drive unit 201 connects a local microprocessor 202 to the matrix 200 and to break switches 203 on the trunk lines from the matrix 200. The microprocessor 202 is connected to the data link to the concentrator via a UART 203A and a MODEM 204.

DC power is obtained from a power feeder and supplied to the data link via a split inductor 205A.

The microprocessor 202 controls testing circuitry 205 which is connected as one of the line circuits on the output side of the matrix 200. The microprocessor also controls a test panel for displaying the status of the system. The microprocessor 202 also receives signals from the p-wires of the line circuits via a p-wire interface 206.

Power for the remote terminal is carried over the data link and converted at the concentrator to the voltages required there.

The trunk line testing circuitry contained within the test unit 102 at the remote end and within the testing circuitry 205 at the exchange end is shown in detail in FIG. 3. The dotted lines at A and at B represent electrical circuit interconnection via matrices 100 and 200 and the selected trunk line. The exchange-end testing circuitry 205 is operative to detect leakage to earth and includes a pair of comparators 207, 208, one having its non-inverting input terminal connected to the A leg of the pair from the matrix 200 and the other 208, having its inverting input terminal connected to the B leg of the pair. The other input terminal to each of the comparators is connected via respective 270 kΩ resistors 209, 210 to a constant voltage source. In the case of comparator 207 this is a positive 5.7 volt source connected to its inverting input terminal and for comparator 208 it is a negative 5.7 volt source connected to its non-inverting input terminal.

The input terminals of the comparators that are connected to respective legs of the line from the switching matrix, are each connected to the leg via 470 kΩ resistors 211, 212 in series with respective 100 Ω resistors 213, 214. An earthed, balanced 10 volts, constant voltage source is connected via respective 15 kΩ resistors 215, 216 to the junction between the series resistors, and each of the resistors 215, 216 to the junction between the series resistors, and each of the resistors 215 and 216 is shunted by a 5 volt zener diode 217, 218.

The testing circuitry 205 is operated by the microprocessor 202 and detects leakage to earth in any of the trunk lines by being connected thereto via the switching matrix 200. If a leakage to earth exists in either of the pair via a path of impedance less than about 20 kΩ, then the voltage at the junctions between resistors 211 and 215 (212 and 216) is pulled down (numerically) below the 5.7 volts comparison voltage. The comparator then changes output state to operate a fault condition display. The circuitry is not only responsive to unbalanced faults but will detect co-existent leakages from both legs, in which case both comparators respond. Similarly a leakage from one leg to the other will produce a response from both comparators.

The test unit 102 at the concentrator end of the trunk lines is operated separately from the test circuitry 205. When the unit 102 is actuated the zener diodes 217, 218 allow current to by-pass the resistors 215, 216, thereby providing a low impedance feed. The tests carried out by the unit 102 are (i) to detect whether an intact loop exists via each trunk, (ii) measurement of the earth continuity resistance at the location of the concentrator and (iii) detection of a leg reversal condition. All three tests result in a simple fault/no fault response.

The circuitry for tests (i) and (ii) is connected to the two legs of the line 16 from the switching matrix via a bridge rectifier 110. The loop test circuitry comprises a forward biased LED 111 supplied from the bridge 110, the anode of the LED 111 being connected to the bridge via a 2.2 kΩ resistor 112. The LED 111 is shunted by a 10 k resistor 113. The LED 111 is linked to a phototransistor operative to transmit a signal to the microprocessor 104 when the LED transmits. The earth continuity test circuitry includes an LED 114 forward biased between the positive terminal of the bridge 110, via a 100 Ω resistor 115, and the earth terminal of the pole. The LED 114 and the resistor 115 are shunted by a 3 volts stand-off zener diode 116. The LED 114 is also linked via a photo-transistor to the microprocessor 104.

These tests are carried out on a trunk line upon instruction from the microprocessor 104. The battery at the exchange is connected to the trunk, and the bridge rectifier 110 ensures that the polarity applied to the tests (i) and (ii) is correct even when a pair reversal occurs. An intact loop will cause the LED 111 to transmit, but it should be noted that the shunt resistor 113 ensures that a loop will not be judged intact unless it has an impedance of less than 10 k Ω.

The circuitry for conducting test (iii) to detect reversal of the polarities of the legs of the trunk line comprises an LED 117 reverse biased across the legs A and B of the line. The LED is linked to a photo transistor connected to the microprocessor 104. The anode of the LED 117 is connected to leg B via a reverse biased protection diode 118, and a 2.2 k resistor 119 connects the cathode of the LED 117 to leg A. The correct polarity of the legs A and B causes no current flow through the LED 117 and hence no signal to be transmitted to the microprocessor. When the polarity is reversed, because of incorrect A and B leg wiring a 'fault' signal is sent to the microprocessor.

The results of these three tests are transmitted from the microprocessor 104 along the data link trunk line to the exchange end.

In the foregoing a system has been described in which a remote concentrator concentrates 14 subscriber's lines onto four trunk lines which are deconcentrated just prior to the exchange. In modern digital exchanges however, a number of subscribers' lines pass through analogue to digital CODECs and are multiplexed on a single output bit stream. A typical example might be 128 subscribers' lines being compressed to a single bit stream having 32 time slots. Such a system can be constructed using an initial preconcentration at the exchange from 128 lines to 32 prior to digital conversion. It is envisaged that a concentrator of the form shown in FIG. 1, suitably expanded, may be used as a pre-concentrator either remote or local to the exchange. The data line containing information such as "subscriber x on trunk line y" can then be fed to a time assignment CODEC to enable it to assign that transmission to any desired time slot. Thus a subscriber's line may be connected to any one of the concentrated lines.

I claim:

1. A telecommunication network comprising:
   an exchange and a concentrating apparatus located remotely from the exchange at a subscriber's distribution point,
   a plurality of subscribers' input lines connected to said concentrating apparatus and a fewer number of trunk output lines connecting the concentrating apparatus to the exchange,
   said concentrating apparatus including
   (a) a semi-conductor switching matrix with a plurality of crosspoints for selectably connecting respective input lines to respective output lines,
   (b) switch operating means,
   (c) processing means connected to control said switch operating means to make or break said crosspoints, and
   (d) a line-condition detector connected at further input line to said switching matrix and being connected by said switch operating means to successive other ones of said input lines via a selectably variable pair of a plurality of pairs of said crosspoints, each pair being associated with a usable output line, the line-condition detector thereby scanning the input lines and being operative to determine whether any input line requires connection to an output line.

2. A telecommunication network as in claim 1 including a data link from said apparatus to the exchange and operative to transmit data indicative of signals from the input lines.

3. A telecommunication network comprising:
   an exchange,
   a plurality of subscribers' input lines connected to said exchange;
   said exchange including a preconcentrator for concentrating calls from a plurality of input lines onto a fewer number of output lines, said preconcentrator including
   (a) a semi-conductor switching matrix with a plurality of crosspoints for selectably connecting respective input lines to respective output lines,
   (b) switch operating means,
   (c) processing means connected to control said switch operating means to make or break said crosspoints, and (d) a line-condition detector connected at a further input line to said switching matrix and being connected by said switch operating means to successive other ones of said input lines via a selectably variable pair of a plurality of pairs of said crosspoints, each pair being associated with a usable output line, the line-condition detector thereby scanning the input lines and being operative to determine whether any input line requires connection to an output line.

4. Telecommunication apparatus for concentrating a plurality of subscriber communication lines onto a smaller plurality of communication trunk lines, said apparatus comprising:

a crosspoint switch matrix having plural row inputs individually connected to respective ones of said plurality of subscriber lines and having plural column outputs individually connected to respective ones of said plurality of trunk lines;

said crosspoint switch matrix including a matrix of controllable switches at each matrix row, column intersection for selectively connecting any one of the subscriber lines to any one of the trunk lines;

line scan gate means for determining whether a subscriber line is requesting communication via a trunk line, said line scan gate means being connected to a further input row of said crosspoint switch matrix; and switch control means connected to said switches for selectively connecting said line scan gate means to any one of the subscriber lines by activating a respectively associated pair of said switches within a selected column, also connected to one of said trunk lines, whereby the condition of each of said subscriber lines is scanned.

5. Telecommunication apparatus as in claim 4 further comprising:

controllable break switch means connected in each trunk line and synchronously controlled by said switch control means so as to electrically isolate each trunk line from the apparatus except when being used by a subscriber line for telecommunication purposes.

6. Telecommunication apparatus as in claim 4 further comprising:

tester circuit means connected to a still further input row of said crosspoint switch matrix for testing electrical fault conditions over any selected one of said trunk lines when selectively connected thereto by said switch control means.

7. Apparatus for concentrating a plurality of telecommunication lines received as inputs to a fewer number of output lines, comprising:

a semiconductor switching matrix with a plurality of crosspoints for selectably connecting respective input lines to respective output lines;

switch operating means controlled by processing means and operative to make or break said crosspoints; and a line-condition detector connected at a further input line to said switching matrix, and being connected by said switch operating means to successive ones of said input lines via a selectably variable pair of a plurality of pairs of crosspoints, each pair being associated with a usable output line, the line-condition detector thereby scanning the input lines and being operative to determine whether any input line requires connection to an output line.

8. Apparatus as claimed in claim 7 wherein said line condition detector is operative to detect a completed signalling loop on any of said input lines to which it is connected, by sensing the electrical potential indicative of a completed loop, and applies a charging current to each input line prior to attempting to sense said potential.

9. Apparatus as claimed in claim 8 wherein said line condition detector includes means for applying charging current to each said input line so that a charging potential is applied to the line which potential increases with a linear slope.

10. Apparatus as claimed in claim 7 including testing circuitry connected as a further input line to said switching matrix.

11. Apparatus as claimed in claim 7 located in a telecommunication system remotely from an exchange and at a subscribers' distribution point, said input lines being subscribers' lines and said output lines being trunk lines.

12. Apparatus as claimed in claim 11 in which the processing means controlling said switch operating means is connected by a dedicated data link to the exchange.

13. Apparatus as claimed in claim 12 wherein the exchange includes means for supplying electrical power for the remote apparatus along said dedicated data link.

14. Apparatus as claimed in claim 11 wherein said switching matrix comprises a balanced, two-wire network which receives line currents and voltages including ringing current.

* * * * *